Feb. 29, 1944.       P. H. JONES       2,343,113
TREATING DRILLING MUD
Filed Feb. 14, 1939
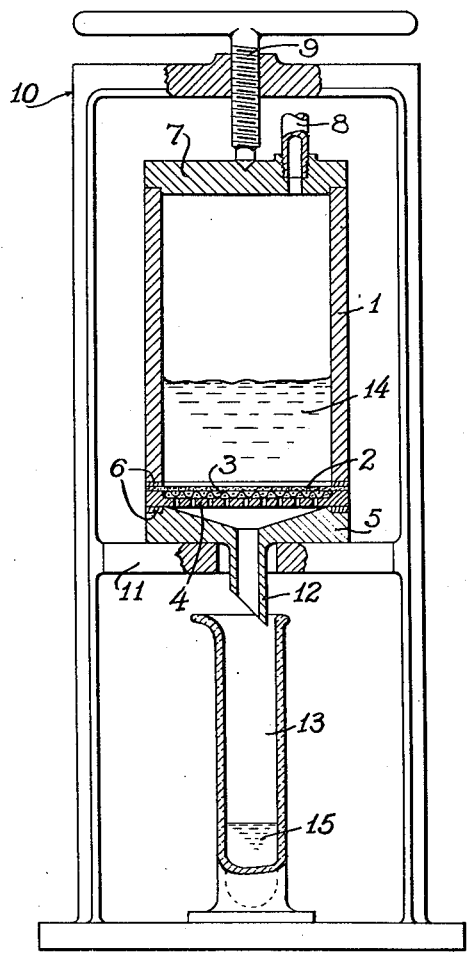
INVENTOR.
Philip H. Jones
BY Philip Subkow
ATTORNEY.

Patented Feb. 29, 1944

2,343,113

UNITED STATES PATENT OFFICE 2,343,113

TREATING DRILLING MUDS

Philip H. Jones, Redondo Beach, Calif., assignor to Union Oil Company of California, Los Angeles, Calif., a corporation of California Application February 14, 1939, Serial No. 256,304

6 Claims. (Cl. 252—8.5)

This invention relates to the chemical treatment of muds, such as are employed in the drilling of oil wells, and to the reclaiming of such muds which have become contaminated with cement or similar materials. This application is a continuation in part of my co-pending application, Serial No. 150,745 for Reclaiming cement cut drilling mud, filed June 28, 1937.

In general, it may be said that muds, such as those employed in the drilling of oil wells, are colloidal suspensions of clay in water to which other materials, such as barium sulfate, may be added in order to increase their apparent specific gravity. The physical characteristics of these clay suspensions are largely determined by the properties of the individual clay particles, most important of which are size, shape and surface characteristics. Furthermore, it is recognized that clays, which consist predominately of hydrated silicates of alumina, when suspended in water, possess an appreciable electric charge, such charge in general being of a negative character.

Until recently, it has been considered that the principal functions of a mud in drilling operations are three-fold: It should form a cake upon the wall of the hole. It should retain in suspension the cuttings formed so that the latter may be removed from the hole along with the mud, and it should possess sufficient weight to overcome any pressure encountered during drilling. These functions are considered in more detail below.

One of the primary difficulties encountered in the drilling of wells is that due to the sloughing or caving into the hole of the formations penetrated. Prior to my discovery, the use of drilling muds was commonly supposed to lessen the tendency for caving by "mudding-off" the formations, that is, forming a cake on the walls of the hole. I have now discovered that muds which form a thick tough cake increase the tendency for sloughing, and that muds that form a thin gelatinous cake are the most desirable.

In order for drilling to proceed smoothly, means must be provided for continuously removing the cuttings from the hole and to this end drilling mud is circulated through the hole. The mud must be of sufficiently low viscosity to allow it to be readily pumped and it should be thixotropic. Thixotropy is that property of colloidal suspension which involves an increase in gel strength as a function of the time of quiescent standing. This property is valuable in that it prevents, to a large extent, the sedimentation of the cuttings in the hole during periods of suspended circulation. However, immediately after violent agitation, such as is induced by the circulation of the mud, cuttings will settle a short distance and this fact is utilized for their removal in a settling tank provided for the purpose and in which the degree of agitation is suddenly lowered to practically zero. I have found that a mud which has proper wall building characteristics and is pumpable will have adequate thixotropic properties.

Obviously, the total weight of a mud must be sufficiently great to prevent blow-outs from any high pressure formations that may be encountered, but beyond this point, the need for greater weight is problematical. A rapid reduction in the hydrostatic head maintained on formations, caused by a reduction in the weight of the mud or by permitting the level of the mud in the well to fall while removing the drilling tools from the hole may cause dangerous caving. Therefore, mud is usually pumped into the well while removing the drill string in order to maintain a substantially constant hydrostatic head on the formations being drilled and the mud weight is always kept as constant as practical. In general, the practice has been to keep the weight of mud only sufficiently high to prevent blow-outs. It is common practice to increase the specific gravity of a mud by adding insoluble materials of high specific gravity, such as, for example, barium sulfate. Because of their insolubility, the usual weighting agents employed have little effect on the performance characteristics of a mud.

I have discovered that by employing a drilling mud which possesses a minimum tendency to lose water from the fluid to the formation, a marked reduction in the caving of formations and consequent reduction in the sticking of drilling tools is realized. It has been found that the structural strengths of most formations which are penetrated during drilling are sufficient to prevent the walls of the hole from caving but that many such formations are considerably weakened when saturated with water and when so wet often slough into the hole. Frequently such action causes seizing of the drill pipe or tools so that they cannot be moved and costly fishing jobs result. It is, therefore, of the greatest importance to prevent loss of water from the drilling mud to the formations drilled. As will be brought out more fully hereinbelow, muds which inherently form thick cakes on the walls of the hole lose an undesirable amount of water to the formations being drilled. I have found that highly viscous muds may lose water to the formations even more rapidly than thin muds, depending on their filtration characteristics. Furthermore, the deposition of a very thick or hard cake upon the wall of the hole is undesirable as it may interfere seriously with the entrance or withdrawal of the drilling tools. Thus the ideal mud should permit very little if any loss of water to formation, and should deposit only a relatively thin mud cake on the walls of the hole.

As has been mentioned hereinabove, the most important physical characteristic of a drilling mud is its ability to form a thin impervious cake on the walls of the hole thereby sealing formations against infiltration of water. The terms cake-forming and water-loss properties, sealing properties and, as will be brought out hereinbelow, filtration characteristics or filter rate are used synonymously throughout this specification to denote this characteristic.

As the result of extensive research, I have discovered that a measure of the tendency for a mud to lose water to the formations being drilled and to form a thin impervious cake upon the wall of the hole can be obtained by means of a simple filtration test to be described hereinbelow. In this test the cake-forming properties of the mud are correlated with the ease with which water can be filtered from the mud through a permeable membrane. In fact, I have found that the sealing properties of the mud are almost entirely dependent upon the character of the mud-cake formed when the latter is pressed against a membrane or filter permeable to water and are very largely independent of the character of the membrane or filter employed. As a consequence, the "filtration rate" of a mud becomes of prime importance in determining the quality of the mud.

In testing the relative sealing properties of a mud, samples of the actual formation concerned may be employed as the permeable membrane in the filtration test. However, it has been found expedient and equally accurate to employ an ordinary filter paper. In practice the sealing properties of the mud may be determined, for example, with a filter unit of the type shown in Figure 1. A 3-inch internal diameter cylindrical filter chamber 1, closed at the lower end by filter paper 2 (Whatman No. 1 filter paper) 100 mesh screen 3, perforated plate 4, and the collecting plate 5, sealed with gaskets 6. The upper end of cylinder 3 is closed by plate 7 containing the air inlet pipe 8. The assembly is held together by pressure applied by screw 9, reacting through frame and filter support 11. Collecting plate 5 is provided with a tube 12 which conducts the expressed filtrate into graduated cylinder 13. In preparing for a test, the top plate 7 is removed and 600 ml. of mud 14 is introduced into cylinder 3. Plate 7 is then put in place and the upper and lower closures of cylinder 3 sealed tightly by the application of pressure by means of screw 9. Air is then forced in through pipe 8 to maintain a pressure of 100 pounds per square inch in the upper part of the filter chamber for the duration of the test. Filtration of the water then begins, and the filtrate 15 is collected and measured in the graduated cylinder 13. After one hour of filtration, cylinder 13 is set aside and the filter disassembled. The fluid mud remaining in the filter chamber is poured out, and the filter cake of mud particles at the bottom of the filter is washed with a stream of water to remove any mud not firmly compacted in the cake.

The test measurements consist in determining the total volume of filtrate water obtained during the first hour of pressure filtration, the average rate of filtration during the last half of this hour, and the thickness and texture of the mud cake formed during the hour of filtration. Numerous correlations between such tests and actual drilling experience with the same muds have shown that the muds yielding a total filtrate of less than 30 ml. in an hour's filtration period at a temperature of 80° F. when using a 600 ml. sample under a pressure of 100 lbs. per square inch, are usually very satisfactory. On the other hand, muds yielding a total filtrate in excess of 45 ml. under similar circumstances, or a filtration rate of from 25 to 30 ml. per hour during the second half hour of filtration, have been found dangerous to use, particularly when drilling through formations which are readily softened by penetration of water, as cave-ins are liable to occur. Under some circumstances, particularly when drilling surface formations or formations of moderate depth, the permissible maximum filtration rate of the mud above which it becomes dangerous to use may approach approximately 65 ml. under the above circumstances. A mud which is satisfactory for drilling operations will under the conditions of this test, deposit a filter cake of not over one-quarter inch in thickness and of a soft, plastic or gelatinous texture, whereas muds exhibiting unsatisfactory filter rate tend to deposit a thick, tough mud cake. Normally, as has already been mentioned hereinabove, muds possessing acceptable filtering characteristics form good mud cakes and, therefore, in practice only the "filtering rate" is ordinarily observed.

From the foregoing, it may be concluded that in preparing or treating a drilling mud in order to endow it with properties which will tend to insure satisfactory performance in the field, it is desirable that the treated mud when tested as above described, yield a total filtrate of not over 55 ml. in the first hour of filtration, and that the deposited cake be preferably less than one-quarter inch in thickness and preferably of a soft gelatinous texture.

As has already been mentioned hereinabove, a mud in order to be usable, must be capable of being readily and easily circulated by means of a pump such as is ordinarily employed for the purpose in the field. From a practical standpoint, it has been found that within certain limits the more readily the mud can be circulated, the faster will drilling proceed. On the basis of a large number of experiments, it has been determined that for most operations, the viscosity of the mud should be less than 55 seconds as determined by the Marsh funnel viscometer when employing the 500 ml. in and 500 ml. out method. It has been observed that muds having funnel viscosities in excess of 55 seconds give rise to impaired circulation rates and increase the danger of gas cutting. The data obtained with the funnel viscometer are empirical and the prior history of the mud will influence greatly the results obtained. For example, in one case it was found that a sample of mud had an indicated funnel viscosity of approximately 45 seconds immediately after being taken from a ditch where it was flowing very slowly whereas a viscosity of 30 seconds was obtained immediately after agitation. Funnel viscosity determinations should, therefore, be made on samples that have been thoroughly agitated or in rapid motion immediately before the tests are started. Throughout this specification and the claims, wherever the terms viscosity, Marsh viscosity, apparent viscosity, or funnel viscosity are employed, they relate to the viscosity as determined by means of the above test, a description of which can be found in an article by H. N. Marsh entitled "Properties and treatment of rotary mud" appearing in the transactions of the A. P. I. M. E. Petroleum Development and Technology, page 236 et seq. in 1931.

Furthermore, I have found that when the viscosity of a mud is sufficiently low to permit it to be readily circulated and the filtration rate is within the limits described hereinabove, the mud will ordinarily possess sufficient thixotropic properties for all practical purposes.

Hence, I have found that by regulating the viscosity and the filter performance of a mud within the limits prescribed hereinabove, all of the other performance characteristics of a mud, as they relate to its use in well drilling and particularly oil well drilling, are acceptable.

It is, therefore, one of the objects of my invention to provide for a chemical treatment of a drilling mud which will cause the latter to have a "filtration rate" of less than approximately 45 ml. and at most not more than 55 ml. in the first hour of filtration and a viscosity of less than approximately 55 seconds as determined by the tests described hereinabove, such treatment simultaneously controlling all of the other performance characteristics of the mud to a desirable extent.

The term "performance characteristics" is hereby used to include wall building, water-loss and thixotropic properties and viscosity but does not refer to the specific gravity of the mud.

In the usual field operations, it is often necessary to form a cement plug in the hole and to subsequently drill through this plug, thereby contaminating the mud with cement. Mud which has been contaminated with cement is termed "cement-cut mud." It has been observed that such muds usually possess poor performance characteristics in accordance with the quality definitions given hereinabove and that the greater the contamination, the poorer the quality. Cement-cut muds often become so viscous in character that it is difficult, and often impossible, to circulate the contaminated material. This increase in apparent viscosity may impart "gas cutting tendencies" to the mud, that is, prevents the escape of gas from the mud, and tends to prevent the proper release of cuttings therefrom. Further, as will be discussed more fully later, such muds form thick, pervious cakes upon the wall of the hole which permit the ready penetration of water into the formation.

Cement, as is well known, comprises a complex mixture of compounds of calcium, magnesium, iron, aluminum and silicon. Although it has not been established beyond question and I do not desire to be bound by the theory, it is believed that the poor performance characteristics imparted by the presence of cement to an otherwise satisfactory drilling mud is due, in part, to the coagulation or flocculation of the negatively charged clay particles by the polyvalent positively charged metallic ions leached from the contaminating cement. Normally, by far the largest proportion of the positive ions leached from cement are calcium ions. Muds may also become similarly contaminated during drilling operations by coming in contact with penetrated formations which contain materials, such as gypsum, from which polyvalent metallic ions may be leached by the aqueous phase of the drilling fluid.

Furthermore, depending upon the particular source, even the virgin clays employed for preparing drilling muds may contain materials capable of yielding polyvalent metallic ions when the clay is dispersed in water.

In any event, by whatever means the contamination may take place, it appears that the presence of polyvalent metallic ions either in solution in the aqueous phase and/or in combination with the negatively charged clay particles, is highly undesirable in that such a condition adversely affects the performance characteristics of the mud.

In the past when drilling muds have become contaminated or, in any event, when their apparent viscosities have become undesirably high, it has frequently been the practice to remove the mud from the hole and to dispose of it as useless material. Such practice involved a considerable disposal problem and, furthermore, it entailed considerable expense for the purchase of new mud. When a change in the specific gravity of the mud was of no consequence, it has been the practice in some fields to lower the viscosity of cement-cut muds by the addition of water. I have found this to be highly undesirable inasmuch as such muds normally have excessively high filter rates.

Muds reclaimed by means of chemical treatment, unless properly controlled, will not be of high quality nor will they alleviate the difficulties encountered from the caving of formations. The reason for this, as I have discovered, is that a chemical treatment which merely controls the viscosity of the mud is insufficient unless attention has also been give to the cake-forming and water-loss properties of the mud and their importance.

I have found that in treating mud with chemical reagents, which will control both the viscosity and the filtration rate of the mud, it is possible to add the reagent to the mud either after the contamination has taken place or, in those cases where it is known that the mud is going to be contaminated by a certain material, such as for example, when it is anticipated that a cement plug will be drilled through and that the mud will then become contaminated with cement, the chemical reagent can be added to the mud prior to said contamination. This latter type of treatment immunizes the mud against any substantial variation in its performance characteristics upon subsequent admixing with the contaminating material. Illustrative of this point, I have observed that when mud becomes contaminated with cement, its viscosity and filtration rate become undesirably high, but that these factors can be reduced to desirable values by the addition to the contaminated mud of sodium bicarbonate. On the other hand, by adding sodium bicarbonate to the mud, prior to contamination with cement, the performance characteristics of the mud are not materially affected and upon the subsequent addition of cement, the performance characteristics continue to remain substantially unchanged.

It is, therefore, an object of my invention to provide for a chemical treatment for the conditioning of mud, particularly of contaminated muds, and to so control the treatment that either the viscosity or the filtration rate or both will be improved, the final treated mud to have a viscosity of less than 55 Marsh seconds, and preferably about 25 to 35 Marsh seconds, and a filtration rate of less than 45 ml. per first hour of filtration and preferably less than 30 ml. per first hour.

It is another object of my invention to provide for a chemical treatment of mud which will simultaneously control the cake-forming and water-loss properties, the viscosity and the thixotropic properties of the mud and which will not markedly alter the specific gravity of the mud.

It is a further object of my invention to provide for the treatment of a mud with a single chemical which will simultaneously control both the viscosity and the cake-forming properties of the mud.

It is an additional object of my invention to provide for a "combination treatment" of muds comprising the addition of one or more chemicals which will control the viscosity of the mud without acceptably altering its cake-forming properties and a second chemical or combination of chemicals which will control the cake-forming properties of the mud without acceptably controlling its viscosity, such combination treatment not materially altering the specific gravity of the mud.

It is also an object of my invention to provide for the chemical pretreatment of mud in order to render it immune to the effects of subsequent contamination with cement or similar materials thereby providing for retaining the mud at all times in excellent condition in terms of the desirable properties enumerated hereinabove.

I have discovered that by a suitable choice of chemical treatment, not only can the viscosity of a mud, and particularly of a contaminated mud, be controlled, but the cake-forming and water-loss properties of the mud, as measured by the filtration rate, can also simultaneously be regulated and maintained at a high quality. It has further been determined that controlling the viscosity of a mud, and especially of a cement-cut mud, does not necessarily control the filtration rate of the mud. In fact, I have discovered that, depending on the effect of any particular compound upon the performance characteristics of a given mud, chemical reagents may be divided into five groups, namely: (1) those which have little or no effect on the performance characteristics, (2) those which have a deleterious effect, (3) those which will control the viscosity but will not lower the filtration rate to a desirable value, (4) those which will control the filtration rate but will not lower the viscosity to a desirable value, and (5) those which will simultaneously control both the filtration rate and the viscosity of a mud to an acceptable extent.

I have found that it is desirable in practicing this invention, to improve the performance characteristics of a mud, not to employ an amount of chemical in excess of the minimum amount necessary to obtain the desired performance characteristics. If the reagent exceeds this minimum amount in any great excess, the mud will be deleteriously affected. Therefore, in making the above classification, it is considered that the chemicals are added in relatively small proportions, normally, in the amount required to react with, or negative the influence of, the contaminating material present. By the application of the above described tests, it may be determined what that necessary amount of any given reagent, or reagents, is for any mud.

Before considering the types of reagents belonging in the various groups, it must first be emphasized that, as might be expected, naturally-occurring clays and the muds prepared from them, vary considerably in character. For example, they differ in ultimate chemical composition, in amounts and type of colloidal material, and in amounts and type of impurities. Furthermore, the common contaminants which may become included in the mud during its use in drilling operations, namely, calcium hydroxide leached from cement, and gypsum, differ in type, one being a fairly strong base and the other a neutral salt. As a consequence, and in view of the complex character of colloidal dispersions, it is only logical to expect that, in general, the performance characteristics of muds prepared from clays of different origins or even of the same mud contaminated with different materials, will not necessarily be affected in the same manner by the addition of any given chemical. As a matter of fact, it has been found, as will be demonstrated hereinbelow, that the performance characteristics of different muds or of the same mud contaminated with different types of materials, are in general affected differently by any given chemical reagent.

In spite of these variations, I have found that certain general rules may be applied to permit of the choice of chemicals to be used and to assist in the classification of chemical compounds into the various groups defined above, and these general rules are presented below.

It will be recalled that the addition to mud of materials which are relatively insoluble in water, such as barium sulfate, iron oxide, etc., has little or no effect upon performance characteristics. Such reagents, therefore, naturally fall into group (1). And in general, it may be said that the reagents naturally falling into group (1) comprise those compounds which are insoluble in the aqueous phase of the mud.

Materials, such as calcium hydroxide and magnesium chloride, which will dissolve in water to form polyvalent metallic ions, will exert a harmful effect on the performance characteristics of mud. Reagents of this type, therefore, obviously belong in group (2) as harmful. Normally, the strong mineral acids, such as sulfuric acid and hydrochloric acid, whose neutral calcium salts are soluble to the extent of more than 0.15 gram per 100 grams of water at 10° C., when added alone, also belong in group (2) as harmful.

I have found that the reagents belonging in groups 3, 4 and 5, and the use of which form the basis of this invention, comprise those acids whose calcium salts are soluble in water to the extent of less than 0.15 gram per 100 grams of water measured at 10° C. This definition is intended to exclude the various acids of phosphorus from group (2) and include them in groups (3), (4) and (5). It is recognized that under certain specific conditions, complexes of calcium ions, with complex phosphate ions, do not precipitate but these complexes appear to be of such a character that for the purposes of this invention, it may be considered that the complex had a solubility of less than 0.15 gram per 100 grams of water at 10° C. By the term "acid," it is meant to include all of those compounds, whether organic or inorganic, which contain a hydrogen atom capable of being replaced by a metallic ion. Such acids include carbonic acid, acids of phosphorus, oxalic acid, pyrogallol, tannic acid, etc.

I have also found that the alkali metal and ammonium, neutral and acid, salts of the aforementioned acids, i. e., the acids the calcium salts of which are soluble in water to the extent of not more than 0.15 gram per 100 grams of water measured at 10° C., are also suitable for treating muds and, therefore, also belong in groups 3, 4 and 5. Such salts include sodium carbonate, sodium bicarbonate, sodium tetraphosphate, tetra sodium pyrophosphate, potassium oxalate, sodium tannate, ammonium carbonate, etc.

The allocation into groups 3, 4 or 5 of any particular acid or salt of the classes enumerated hereinabove in any given case will depend principally upon the character of the contaminating or flocculating agent and the classification can be most easily made without any knowledge of the mud or the character of the contaminating agent by simply adding a small proportion of the particular reagent, for example 0.1% to 1.0%, to the mud under consideration and determining the effect on the viscosity and filtration characteristics. The methods employed for making performance tests have been outlined in detail above. In determining the effect of chemicals on a mud, the procedure employed in the laboratory has been to add the desired amount of the chemical or chemicals to the mud followed by a thorough agitation of the mixture for one hour prior to the conducting of the performance tests.

It will be observed that such a procedure completely eliminates any necessity for making a chemical analysis of the mud and, as a consequence, I have found it to be the most practical method which can be employed in the field.

However, I have also found that, in general, virgin muds can be classified into four groups on the basis of the calcium and sodium salt content of the aqueous phase of the mud. By the term "virgin mud" is meant a mixture of the clay as it is derived from the earth with an appropriate amount of water such mixture never having been used for any purpose; nominally, a mud comprises a mixture of about 70 parts by weight of water and 30 parts of clay and this is the composition of the muds to be considered in the following discussion. By the term "used mud" is meant a virgin mud which has been used either in the field in the drilling of a well or for some other purpose.

I have found that the aqueous phases expressed from certain virgin muds contain essentially no dissolved calcium salts, that is, less than 30 grains per gallon of calcium, expressed as calicum carbonate. Typical of this class is Wilmington slough mud which is derived from Bixby slough in the vicinity of Wilmington, California. The aqueous phases expressed from many other virgin muds contain dissolved calcium salts in excess of 30 grains per gallon. Typical of this class is Cayama Valley mud, the clay for which is mined about 20 miles west of Maricopa, California. Other muds of this same type ar Devils Den mud, Coalinga red mud, and muds derived from clays mined at various points in the Mohave Desert.

Aside from the calcium salt content of the aqueous phase, I have also observed that the said phase, depending on the source of the particular clay, may also contain chloride salts, expressed as sodium chloride to the extent of as much as 500 grains per gallon or even more. I have found that muds in which the expressed aqueous phase contains in excess of 300 grains per gallon of sodium chloride are less amenable to chemical treatment to lower their filter rate than muds of lower sodium chloride content regardless of whether the calcium salt content of the aqueous phase is high or low. The greater the excess of sodium chloride above 300 grains per gallon the less the effect of chemical treatment. However, I have found that where it is practicable to employ such muds in drilling a well and replacing the water lost from the mud with fresh water of low total salt content, the sodium chloride content of the aqueous phase can be decreased to a value below 300 grains per gallon and when this has occurred, the "used mud" is then amenable to chemical treatment in the same manner as virgin muds which have less than 300 grains per gallon of sodium chloride in the aqueous phase. The aqueous phases in many samples of Wilmington slough mud contain in excess of 300 parts per million of sodium chloride while the aqueous phases in samples of high calcium content mud vary widely, some containing above and others below 300 grains per gallon of sodium chloride.

Virgin muds in which the aqueous phase contains in excess of 30 grains per gallon of calcium, expressed as calcium carbonate, are believed to be flocculated to a considerable extent and hence are termed "flocculated muds" in this specification. However, it is certain that flocculation is far from complete and so it is not to be implied from such term that the mud is completely flocculated.

On the other hand, virgin muds in which the aqueous phase contains less than 30 grains per gallon of calcium, expressed as calcium carbonate, are termed "non-flocculated muds" in this specification. By this term it is not meant to insinuate that the mud is completely deflocculated but merely to denote that, although there may be some flocculation due to the presence of calcium ions, these calcium ions are not present in sufficient quantity to give an appreciable concentration of calcium salts in the aqueous phase. Further, it should be noted that the classification of muds into "flocculated" and "non-flocculated" is made irrespective of the sodium chloride content of the aqueous phase. Used muds are classified on the basis of the characteristics of the virgin muds from which they were derived.

In general, it has been observed that the addition of a neutral salt, or mixtures of such salts, selected from the classes mentioned hereinabove to either flocculated or non-flocculated virgin muds, or of used muds which have become contaminated with neutral salts of polyvalent metallic ions, such as calcium sulfate, will improve the performance characteristics of such muds and bring said characteristics within the limits specified hereinabove. It has been found specifically that a further treatment with a small proportion of quebracho may still further improve the filter rate over that obtained by the addition of a neutral salt alone.

Where non-flocculated muds become contaminated with basic materials of the type of calcium hydroxide, the performance characteristics of such contaminated muds may be improved by the addition of either an acid selected from the class mentioned hereinbefore or of an acid salt selected from the class mentioned hereinabove. On the other hand, flocculated muds which become contaminated with basic materials, of the type of calcium hydroxide, are improved by the addition of either an acid salt of the type mentioned hereinabove or of a mixture of an acid or acid salt with a neutral salt selected from the classes already mentioned hereinbefore.

As examples of the practical application and results of the process of this invention as applied to flocculated and non-flocculated muds the following tabulated data are presented. The aqueous phases of the muds treated contained originally less than three hundred parts per million of sodium chloride.

In passing it should be noted that when more than one reagent is employed in the treatment of a mud, the order of addition of the reagents may be of importance. For example, in the treatment of a virgin Cayama Valley mud it was found that the addition of sodium carbonate followed by the addition of sodium tetraphosphate in appropriate proportions almost immediately effected an improvement in the performance characteristics of the mud. However, when the order of addition was reversed, several hours elapsed after the treatment before the same improvement in the performance characteristics was noted. In some cases, it has been observed that a certain order of addition will give better performance characteristics than the reverse order of addition. In the foregoing tables, therefore, unless otherwise noted, it will be considered that the chemicals are added in the order in which they are listed, since they give, when added in such order, the most desirable results.

In the practice of this invention in the field, the treating agents may conveniently be added to the circulating mud stream at a point adjacent to the mud pump suction inlet in the mud sump. Thorough admixture of the thus introduced reagents may be assured by rapid recirculation of the mud from the mud sump through a spare slush pump. During treatment mud samples may be taken from the circulating mud stream at frequent intervals and tested in order to determine when the desired degree of treatment has been effected.

The data presented in Tables I and II concern the treatment of cement-contaminated virgin Cayama Valley and used Wilmington slough muds employed as examples of the classes of flocculated and non-flocculated muds, respectively. A study of the data given in these two tables will disclose the following facts:

(1) The addition of sodium bicarbonate (Experiment 2 in Tables I and II) in an amount approximately equal to the weight of the contaminating cement reduces both the viscosity and the filtration rate of each of the contaminated muds to acceptable values. It will be observed, however, that in the case of the Cayama Valley mud, the performance characteristics are better than those for the original mud before contamination, whereas in the case of the Wilmington Slough mud, although the viscosity of the treated mud is somewhat lower than that of the mud before contamination, the filtration rate is slightly poorer but very acceptable.

It should be noted that the addition of sodium bicarbonate to cement-contaminated muds of various origins and in an amount approximately equal to the weight of the contaminating cement has been found effective in the treatment of such cement-contaminated muds to give products having acceptable performance characteristics. The addition of bicarbonates of other alkali metals and of ammonia and mixtures of carbon dioxide and an alkali metal carbonate have also been found effective in a manner similar to the sodium bicarbonate in the treatment of such cement-contaminated muds. Carbon dioxide is also effective.

(2) Sodium carbonate (Experiment 3, Tables I and II) in an amount approximately equal to the weight of the contaminating cement, is effective in lowering the filtration rate to a desirable value but does not appreciably affect the viscosity.

(3) The addition of quebracho and pyrogallol, respectively, to flocculated virgin muds which are contaminated by cement (Experiments 5 and 8 in Table I) caused a marked reduction in the viscosity of the mud but had little effect upon the filtration rate. On the other hand, the addition of quebracho and pyrogallol, respectively, to the cement-contaminated used Wilmington Slough mud, that is to a non-flocculated mud which has been contaminated by cement, in the amounts specified in the table (Experiments 5 and 7 in Table II) caused a marked reduction not only in the viscosity but also in the filtration rate of the mud, so much so that the resultant treated contaminated mud was superior in performance characteristics to the original used mud.

As a further example of the fact that a given reagent has a different effect on muds belonging to different classifications, it will be observed from the comparison of Experiment 14 in Table I and Experiment 11 in Table II that casein had little effect on either the viscosity or the filtration rate of the cement-contaminated Cayama Valley mud, that is of a cement-contaminated mud originally partially flocculated, whereas in the case of a cement-contaminated Wilmington Slough mud, the same reagent in the same proportion markedly lowered both the viscosity and the filtration rate and produced a usable mud.

(4) A treatment comprising the addition of a reagent which will lower the filtration rate without acceptably lowering the viscosity (sodium carbonate) and a reagent which will lower the viscosity without acceptably lowering the filtration rate (quebracho or pyrogallol) apparently produces a combined effect thereby giving a mud of acceptable performance characteristics as is illustrated by Experiments 6 and 9 of Table I. In fact, in the examples given, it will be observed that such a "combination treatment" resulted in the production of a mud having markedly superior performance characteristics even in comparison with those of the virgin mud.

In illustrating this effect still further, it will be noted that in Experiment 12 of Table I, the addition of a small proportion of caustic soda to quebracho and a subsequent addition of this mixture to the cement-contaminated Cayama Valley mud, that is to a flocculated virgin mud containing cement, gave a material having essentially the same viscosity but a lower filtration rate than the addition of quebracho alone. (Compare Experiments 5 and 12 of Table I.) Therefore, in Experiment 13 of Table I the addition of sodium carbonate to the mud was followed by the addition of a mixture of quebracho and caustic soda and the resultant mud had a lower filtration rate than that resulting from a similar treatment with omission of the caustic soda. (Compare Experiments 13 and 6, Table I.)

(5) Exemplary of the fact that in order to realize the desired improvement in performance characteristics the amount of reagent added must be carefully controlled by means of adequate tests such as those which have been set up in the foregoing specification, it will be observed from a comparison of Experiments 7 and 8 of Table II that the addition of 0.1% of pyrogallol was sufficient to lower the viscosity and filtration rate of the contaminated mud to acceptable values but that the addition of 1.0% of pyrogallol, although still resulting in the production of a mud of desirable viscosity characteristics, caused the filtration rate to be increased even above that of the cement-contaminated mud.

The data discussed in the immediately preceding paragraphs has concerned cement-contaminated muds such as are encountered in the field when drilling through "cement plugs" and the reclamation of such muds is a problem of prime importance as has already been mentioned hereinabove. However, it is also a problem of considerable economic significance to condition ordinary drilling muds in order to improve their performance characteristics. It has been mentioned hereinabove that, depending upon the particular source from which the clay is derived, virgin muds may be more or less contaminated with materials, such as polyvalent metallic ions, which tend to cause a partial flocculation the mud or at least to cause the mud to exhibit poor performance characteristics. It has now been discovered that by an adequate chemical treatment, based on a determination of the performance characteristics of the mud and the effects of chemicals on these performance characteristics in the manner described hereinabove, the viscosity and filtration rate of muds can be markedly improved. As examples of the practical application of the treatment of virgin and used muds by means of the principles which have been set forth hereinabove, attention is now directed to the data presented in Tables III, IV, V and VI.

The data presented illustrate the effects upon performance characteristics which may attend the addition of various chemicals and combinations of chemicals to virgin and used muds. It will be observed from the data presented in Tables III, IV, V and VI, and as has already been pointed out in the discussion relating to the treatment of cement-contaminated muds that a given chemical may have a different effect upon the performance characteristics of different muds. Furthermore, it will be noted that a "combination treatment" in which a chemical capable of lowering the filtration rate but not the viscosity with a chemical capable of lowering the viscosity but not the filtration rate can be used for the production of usable mud from a poor quality virgin or used mud.

When upon treatment of muds with sufficient chemicals to bring the filtration rate within the desired values, it may be found that the viscosities fall below the range of from 25 to 35 Marsh seconds which is found to be within the most desirable values. When this occurs, the viscosity may be increased to bring it within the specified range, without detrimental effect upon the filter rate, by increasing the ratio of solids to water in the mud, and this may be accomplished by either allowing a reduction of the water in the mud due to losses to formations, and evaporation or by adding solids such as clay or concentrated colloidal material such as bentonite. In some cases the chemical treatment employed for improving the filtration rate can be limited so as to obtain a filtration rate which is short of the best obtainable by continued treatment but which is acceptable while at the same time limiting the reduced viscosity to a value within the desirable values.

One factor which has not been previously mentioned concerning the chemical treatment of muds is based on the fact that in actual commercial use muds may be exposed to temperatures of as high as 150° F. to 250° F., the temperature depending principally upon the location and the depth at which the drilling is being conducted. It has been observed that many muds which have been chemically treated to improve their performance characteristics tend to deteriorate with respect to these characteristics upon prolonged exposure to temperatures in the neighborhood of 200° F., to 250° F., or even lower as is the case in drilling operations. This is apparently due to the fact that the chemicals added may be hydrolyzed or otherwise affected in such a manner as to alter their original effect upon the performance characteristics of the mud. It might be thought, therefore, that the use of chemicals reacting in this way would be a bar to their practical application in the chemical treatment of muds, and in those cases where the degradation with rise in temperature is rapid, such as in the case of sodium hexametaphosphate, their use may be inadvisable. However, it has been found that many chemicals, which apparently only slowly lose their effectiveness upon exposure to heat, may be utilized. In such cases it is preferable to add the chemical to the mud each day, thereby maintaining a low filtration rate and a low viscosity. The addition of three times as much chemical as is required to maintain the desired performance characteristics over a period of one day will not maintain the performance characteristics over a period of three days. Of course, it is evident that wherever it is feasible, it is preferable to use chemicals whose effect upon the performance characteristics of a mud are not altered by prolonged exposure to elevated temperatures such as may be encountered in the particular zone being drilled, and if such chemical will give the desired performance characteristics according to the tests herein disclosed, such a chemical is the most desirable.

TABLE I

*The characteristics of a virgin Cayama Valley mud contaminated with 0.9% of hydrated cement and the effect of added chemicals on these characteristics*

| Expt. No. | Reagent added, per cent by weight | Marsh viscosity, seconds | Gravity of mud, lbs./cu. ft. | pH | Filtration rate, ml. extruded per 60 min. |
|---|---|---|---|---|---|
| — | (a) | 29.0 | 77.4 | 7.8 | 62.2 |
| + | (b) | Heavy butter | | 10.9 | 112.0 |
| 1 | 0.1% NaHCO₃ | Light butter | | 10.9 | 102.0 |
| 2 | 1.0% NaHCO₃ | 21.5 | | 8.8 | 51.0 |
| 3 | 1.0% Na₂CO₃ | Heavy butter | | 11.3 | 53.0 |
| 4 | 0.1% quebracho | Light butter | | 10.8 | 102.0 |
| 5 | 1.0% quebracho | 22.0 | | 10.3 | 121.0 |
| 6 | 1.0% Na₂CO₃+0.5% quebracho | 24.0 | 78.9 | 10.8 | 26.0 |
| 7 | 0.1% pyrogallol | Light butter | | 10.8 | 105.0 |
| 8 | 1.0% pyrogallol | 26.0 | | 9.0 | 92.0 |
| 9 | 1.0% Na₂CO₃+0.5% pyrogallol | 22.0 | 78.9 | 10.3 | 30.4 |
| 10 | 1.0% citric acid | 25.0 | | 8.0 | 100.0 |
| 11 | 1.0% oxalic acid | 29.0 | | 7.9 | 98.0 |
| 12 | 1.0% quebracho+0.2% NaOH | 21.9 | 78.2 | 10.7 | 97.0 |
| 13 | 1.0% Na₂CO₃+0.1% NaOH+0.5% quebracho | 21.8 | 78.4 | 11.0 | 24.3 |
| 14 | 1.0% casein | Light butter | | 10.7 | 86.0 |

(a) The characteristics of the virgin mud prior to contamination with cement.
(b) The characteristics of the cement cut mud used in the listed experiments.

TABLE II

*The characteristics of a used Wilmington Slough mud contaminated with 0.9% of hydrated cement and the effect of added chemicals on these characteristics*

| Test No. | Reagent added, per cent by weight | Marsh viscosity, seconds | Gravity of mud, lbs./cu. ft. | pH | Filtration rate, ml. extruded per 60 min. |
|---|---|---|---|---|---|
| — | (a) | 29.0 | 71.4 | 8.3 | 33.0 |
| — | (b) | Heavy butter | | 11.5 | 91.8 |
| 1 | 0.1% NaHCO₃ | Medium butter | | 11.5 | 60.0 |
| 2 | 1.0% NaHCO₃ | 22.0 | | 10.8 | 36.6 |
| 3 | 1.0% Na₂CO₃ | Light butter | | 11.2 | 45.0 |
| 4 | 0.1% quebracho | 22.0 | | 11.4 | 61.5 |
| 5 | 1.0% quebracho | 21.5 | 70.4 | 10.7 | 20.9 |
| 6 | 1.0% Na₂CO₃+0.1% quebracho | 34.5 | 70.5 | 11.3 | 35.2 |
| 7 | 0.1% pyrogallol | 20.3 | | 11.4 | 54.5 |
| 8 | 1.0% pyrogallol | 31.0 | | 9.7 | 121.0 |
| 9 | 1.0% citric acid | 22.5 | | 9.2 | 125.0 |
| 10 | 1.0% oxalic acid | 21.0 | | 8.6 | 61.3 |
| 11 | 1.0% casein | 21.0 | | 10.1 | 26.0 |
| 12 | 1.0% sodium silicate | Medium butter | | 11.2 | 48.3 |
| 13 | 1.0% quebracho+0.1% NaOH | 20.8 | 69.9 | 10.9 | 30.5 |
| 14 | 0.2% sodium tetraphosphate | Light butter | 68.5 | 11.3 | 73.8 |

(a) The characteristics of the used mud prior to contamination with cement.
(b) The characteristics of the cement cut mud used in the listed experiments.

TABLE III

*The characteristics of a used Cayama Valley mud and the effect of added chemicals on these characteristics*

| Test No. | Reagent added, lbs./bbl. | Marsh viscosity, seconds | Gravity of mud, lbs./cu. ft. | pH | Filtration rate, ml. extruded per 60 min. |
|---|---|---|---|---|---|
| — | None | 26 | | 7.4 | 84 |
| 1 | 4 lbs. bentonite | Light butter | | | 65 |
| 2 | 4 lbs. bentonite+1½ lbs. Na₂CO₃ | do | | 9.0 | 43 |
| 3 | 4 lbs. bentonite + 1½ lbs. Na₂CO₃ + ¾ lb. Na₄P₄O₁₃ | 28 | | | 33 |
| 4 | 2 lbs. Na₂CO₃ | 34 | | | 52 |
| 5 | 1 lb. Na₄P₄O₁₃ | 23 | | | 76 |
| 6 | 2 lbs. Na₂CO₃+½ lb. Na₄P₄O₁₃ | 23 | | | 48 |

TABLE IV

*The characteristics of a virgin Cayama Valley mud and the effect of added chemicals on these characteristics*

| Test No. | Reagent added, lbs./bbl. | Marsh viscosity, seconds | Gravity of mud, lbs./cu. ft. | pH | Filtration rate, ml. extruded per 60 min. |
|---|---|---|---|---|---|
| — | None | 29 | 79.5 | 7.6 | 50 |
| 1 | 2 lbs. Na₄P₄O₁₃ | 23 | | | 32 |
| 2 | 2 lbs. Na₂CO₃ | Light butter | | | 28 |
| 3 | 2 lbs. Na₂CO₃+1.9 lbs. Na₄P₄O₁₃ | 28 | | 9.0 | 18 |

TABLE V

*The characteristics of a virgin Wilmington Slough mud and the effect of added chemicals on these characteristics*

| Test No. | Reagent added, lbs./bbl. | Marsh viscosity, seconds | Gravity of mud, lbs./cu. ft. | pH | Filtration rate, ml. extruded per 60 min. |
|---|---|---|---|---|---|
| — | None | 60 | 73.5 | 8.3 | 21.6 |
| 1 | 1 lb. Na₄P₄O₁₃ | 24.5 | | 8.0 | 13 |
| 2 | 1 lb. Na₄P₄O₁₃+½ lb. Na₂CO₃ | 25 | | 8.9 | 13 |
| 3 | 1 lb. quebracho | 60 | | 8.0 | 15 |
| 4 | 1 lb. quebracho+1 lb. Na₄P₄O₁₃ | 24.5 | | 7.8 | 13 |

TABLE VI

*The characteristics of a virgin Ajax mud and the effect of added chemicals on these characteristics*

| Test No. | Reagent added, lbs./bbl. | Marsh viscosity, seconds | Gravity of mud, lbs./cu. ft. | pH | Filtration rate, ml. extruded per 60 min. |
|---|---|---|---|---|---|
| — | None | 26 | 84.7 | | *24.0 |
| 1 | 1 lb. Na$_4$P$_2$O$_7$ | 21 | | | *15.0 |
| 2 | 1 lb. Na$_4$P$_2$O$_7$+quebracho | 21.2 | | | *12.5 |

* Values obtained by extrapolation.

The foregoing examples are presented in the nature of illustrations of the practical value of the processes of the invention and are not to be construed as limiting the invention in any sense.

I claim:

1. A method of treating drilling mud to produce a drilling fluid which will possess desirable viscosity, wall-building and water loss properties when used in the process of drilling a well from a mud which does not possess such properties which comprises commingling said mud first with a compound selected from the class consisting of a tannin containing material and an alkali metal carbonate to lower the filter rate of the mud to the desired extent while not appreciably lowering the viscosity of said mud to the desired extent and then commingling the thus treated mud with a compound selected from the class of those acids whose calcium salts are soluble in water to the extent of less than 0.15 gram in 100 grams of water at 0° C. and the alkali metal and ammonium, acid and neutral salts of those acids whose calcium salts are soluble in water to the extent of less than 0.15 gram in 100 grams of water at 0° C. to lower the viscosity of said mud to the desired extent.

2. A method of treating drilling mud to produce a drilling fluid which will possess desirable viscosity, wall-building and water loss properties when used in the process of drilling a well from a mud which does not possess such properties which comprises commingling said mud first with a compound selected from the class consisting of a tannin containing material and an alkali metal carbonate to lower the filter rate of the mud to the desired extent while not appreciably lowering the viscosity of said mud to the desired extent and then commingling the thus treated mud with an alkali metal polyphosphoric acid compound to lower the viscosity of said mud to the desired extent.

3. A method of treating drilling mud to produce a drilling fluid which will possess desirable viscosity, wall-building and water loss properties when used in the process of drilling a well from a mud which does not possess such properties which comprises commingling said mud first with a compound selected from the class consisting of a tannin containing material and an alkali metal carbonate to lower the filter rate of the mud to the desired extent while not appreciably lowering the viscosity of said mud to the desired extent and then commingling the thus treated mud with tetrasodium pyrophosphate to lower the viscosity of said mud to the desired extent.

4. A method of treating drilling mud to produce a drilling fluid which will possess desirable viscosity, wall-building and water loss properties when used in the process of drilling a well from a mud which does not possess such properties which comprises commingling said mud first with a compound selected from the class consisting of a tannin containing material and an alkali metal carbonate to lower the filter rate of the mud to the desired extent while not appreciably lowering the viscosity of said mud to the desired extent and then commingling the thus treated mud with sodium tetraphosphate to lower the viscosity of said mud to the desired extent.

5. A method of treating drilling mud to produce a drilling fluid which will possess desirable viscosity, wall-building and water loss properties when used in the process of drilling a well from a mud which does not possess such properties which comprises commingling said mud first with an alkali metal carbonate to lower the filter rate of the mud to the desired extent while not appreciably lowering the viscosity of said mud to the desired extent and then commingling the thus treated mud with an alkali metal polyphosphoric acid compound to lower the viscosity of said mud to the desired extent.

6. A method of treating drilling mud to produce a drilling fluid which will possess desirable viscosity, wall-building and water loss properties when used in the process of drilling a well from a mud which does not possess such properties which comprises commingling said mud first with an alkali metal carbonate to lower the filter rate of the mud to the desired extent while not appreciably lowering the viscosity of said mud to the desired extent and then commingling the thus treated mud with tetrasodium pyrophosphate to lower the viscosity of said mud to the desired extent.

PHILIP H. JONES.